(No Model.)
J. J. DIX.
BICYCLE SUPPORT.
No. 604,246. Patented May 17, 1898.
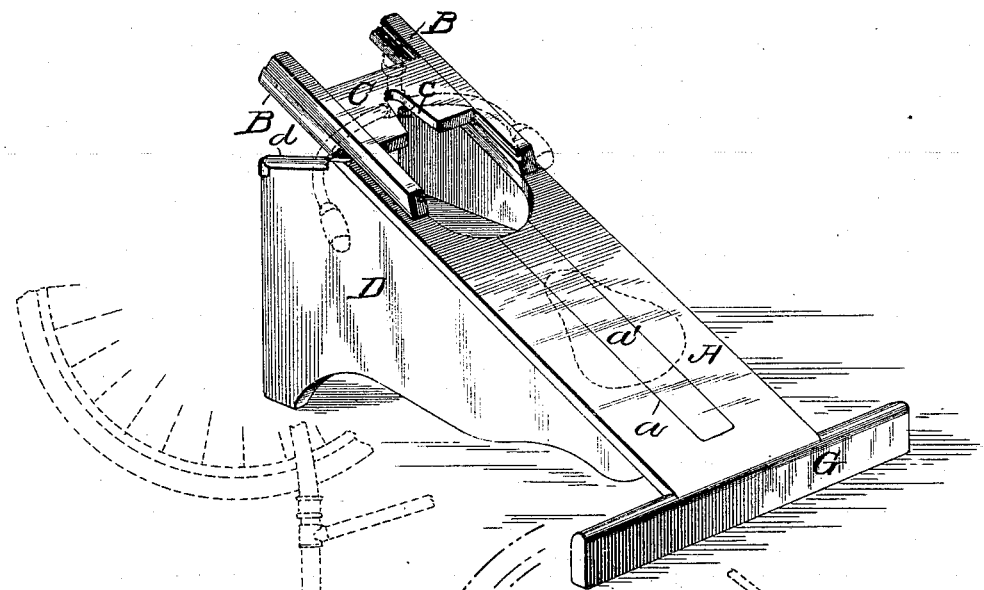
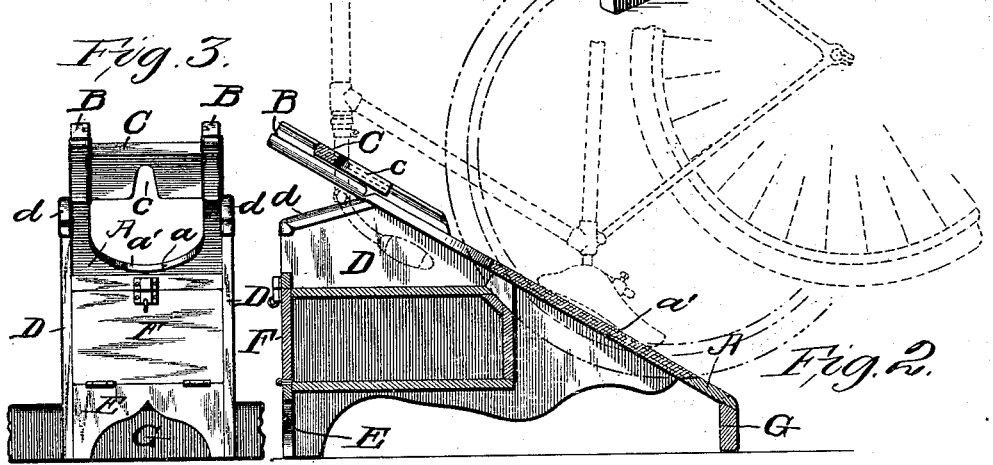
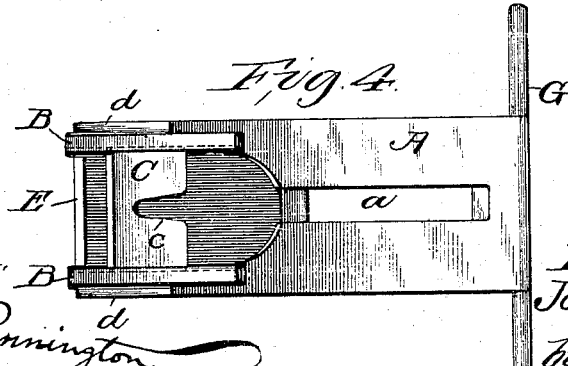
Attest:
G. A. Pennington
Hugh K. Wagner
Inventor:
Jos. J. Dix.
by Paul Bakewell
and J. R. Cornwall
Attys

UNITED STATES PATENT OFFICE.

JOSEPH J. DIX, OF ST. LOUIS, MISSOURI.

BICYCLE-SUPPORT.

SPECIFICATION forming part of Letters Patent No. 604,246, dated May 17, 1898.

Application filed July 12, 1897. Serial No. 644,205. (No model.)

*To all whom it may concern:*

Be it known that I, JOSEPH J. DIX, a citizen of the United States, residing in the city of St. Louis, State of Missouri, have invented a certain new and useful Improvement in Bicycle-Supports, of which the following is a full, clear, and exact description, reference being had to the accompanying drawings, forming a part of this specification, wherein—

Figure 1 is a perspective view of a bicycle-support embodying my invention. Fig. 2 is a longitudinal sectional vertical view through the same. Fig. 3 is an end elevational view of the same, and Fig. 4 is a top plan view.

This invention relates to a new and useful improvement in bicycle-supports, the object being to construct a support of the character described in a simple and cheap manner, doing away with all moving joints, such as pivot-points, &c., the material used being preferably wood.

The support can be used either as a stand in which the front wheel of the bicycle is held in position to maintain the machine in an upright position or the support may be used for the purpose of holding the bicycle in an inverted position, enabling one to clean the bearings, adjust the parts, &c.

With these objects in view the invention consists in the construction of a support provided with open-ended pockets or jaws for receiving the handle-bars of a bicycle, the support being formed with an inclined body portion for receiving the saddle, whereby the weight of the bicycle is so disposed as to thrust the handle-bars more firmly into the jaws and maintain the machine in a rigid inverted position. In addition to this means are provided for securing the steering-head or post of the handle-bars relative to the jaws to prevent side play of the bicycle when in an inverted position.

In the drawings I have illustrated a box-like structure which is provided with a receptacle for tools, waste, or cleaning-rags as a matter of convenience; but it is obvious that other structures can be employed provided with means to accomplish the above result, in which other material could be used and a box-like structure be dispensed with.

In the drawings, A indicates an inclined support, bifurcated at its upper end or formed with two projecting jaws B, which jaws are preferably faced with leather on their inner sides to prevent abrasion of the handle-bars of the bicycle when the same is in an inverted position.

C indicates a sliding lock, preferably formed with tongues on its side edges, which run in grooves in the jaws B, said lock being formed with a recess or pocket $c$ in its inner edge, said notch or pocket coöperating with the steering-head or handle-bar post of the bicycle to prevent lateral movement of the same.

D indicates the side walls, and E the front wall, of the support. This front wall E is preferably formed with an opening, which is closed by a door F, having a suitable catch to lock it in its closed position, said door being the means of gaining access to a box-like receptacle for tools, cleaning-cloths, &c., arranged between the walls D.

The front end of the support is adapted to rest on the floor, while the rear end is provided with a cross-piece G, extending somewhat beyond the sides of the structure to afford a stable support and prevent the structure from becoming top-heavy when the bicycle is in an inverted position thereon, as shown by the dotted lines in Fig. 2. The upper front edges of the walls D are preferably inclined, as shown at $d$, to meet the jaws B and form recesses or pockets, as shown, into which the handle-bars of the bicycle are received. These inclined faces $d$ are preferably provided with non-abrasive material to prevent the handle-bars from being scratched when in position. The support A is also preferably formed with a longitudinally-disposed slot $a$, into which the front wheel of the bicycle may be received when the same is used as an ordinary stand. The support is formed with grooves on each side of this slot, into which grooves run tongues of a sliding cover $a'$, which when in position closes said slot, and its upper face being flush with the face of the support A will offer an even surface upon which the saddle of the bicycle, when the bicycle is inverted, may rest without abrading the saddle.

From the above description it will be seen that when used as a stand the grooved lid $a'$ is removed and the front wheel introduced in the slot $a$, as is well understood.

When it is desired to clean the machine or adjust any of its parts, the machine is inverted, the handle-bars placed in the recesses or pockets formed by the jaws B and the inclined faces d, and the lock C, being slid into position and engaging the steering-head or handle-bar post, will hold the machine rigidly in position and prevent lateral movement. The weight of the bicycle being to the rear of the point where the handle-bars are locked in position will tend constantly to keep the machine rigid, which is due to the fact that the seat being on the inclined plane throws the weight to the rear, and the handle-bars being higher than the seat will cause said handle-bars to exert a constant tendency to keep themselves between jaws B and the inclined faces d.

I am aware that many minor changes in the arrangement, construction, and combination of the several parts of my device can be made and substituted for those herein shown and described without in the least departing from the nature and principle of my invention.

Having thus described my invention, what I claim, and desire to secure by Letters Patent, is—

1. In a bicycle-support, the combination with an inclined portion A, recessed at its upper end, and side walls having cut-away portions at their highest points, forming rests for the handle-bar of a bicycle, the handle-bar stem being received in the recess of the inclined support A, substantially as described.

2. In a bicycle-support, the combination with the inclined portion A, of prongs arranged on its highest end, side walls D having cut-away portions d, and a locking device coöperating with said prongs, substantially as described.

3. The combination with the inclined support A, of prongs B extending from the upper end of said inclined support, a notched locking device slidingly arranged between said prongs, and side walls D having cut-away portions d, substantially as described.

4. The combination with an inclined support A, having a slot a in its lower end, prongs B projecting from the upper end of said inclined support, a locking-plate C slidingly mounted between said prongs, side walls D formed with inclined faces d, and a tool-box, or receptacle, arranged between said side walls, substantially as described.

In testimony whereof I hereunto affix my signature, in the presence of two witnesses, this 2d day of July, 1897.

JOSEPH J. DIX.

Attest:
F. R. CORNWALL,
HUGH K. WAGNER.